(12) United States Patent
Zhang (10) Patent No.: US 12,317,230 B2
(45) Date of Patent: May 27, 2025

(54) METHOD AND DEVICE USED FOR DISCONTINUOUS RECEPTION (71) Applicant: BUNKER HILL TECHNOLOGIES LLC, Allen, TX (US)

(72) Inventor: Xiaobo Zhang, Shanghai (CN)

(73) Assignee: Bunker Hill Technologies LLC, Allen, TX (US)

( * ) Notice: Subject to any disclaimer, the term of this patent is extended or adjusted under 35 U.S.C. 154(b) by 887 days.

(21) Appl. No.: 17/458,575

(22) Filed: Aug. 27, 2021

(65) Prior Publication Data

US 2021/0392622 A1    Dec. 16, 2021

Related U.S. Application Data

(63) Continuation of application No. PCT/CN2021/075059, filed on Feb. 3, 2021.

(30) Foreign Application Priority Data

Feb. 7, 2020 (CN) .......................... 202010083059.7

(51) Int. Cl.
*H04W 72/02* (2009.01)
*H04W 24/08* (2009.01)
(Continued)

(52) U.S. Cl.
CPC ........... *H04W 72/02* (2013.01); *H04W 24/08* (2013.01); *H04W 72/0446* (2013.01);
(Continued)

(58) Field of Classification Search
None
See application file for complete search history.

(56) References Cited

U.S. PATENT DOCUMENTS

2008/0267105 A1* 10/2008 Wang .................. H04W 56/005
370/311
2014/0029459 A1* 1/2014 Kwon .................. H04W 76/28
370/252
(Continued)

FOREIGN PATENT DOCUMENTS

CN           1823538 A     8/2006
CN         108352088 A     7/2018
(Continued)

OTHER PUBLICATIONS

CN202010083059.7 Notification to Grant Patent Right for Invention dated Jul. 20, 2022.
(Continued)

*Primary Examiner* — Mariela Vidal Carpio
(74) *Attorney, Agent, or Firm* — Ascenda Law Group, PC (57) ABSTRACT

The present disclosure provides a method and a device used for discontinuous reception. A first node transmits a first signaling, the first signaling indicating a current parameter of a first timer, and monitors a target signal in a first time-resource set; when the target signal is detected in the first time-resource set and the first timer is in a stopped state, starts the first timer; when the first timer is in a running state, updates the first timer in each candidate slot; wherein the current parameter of the first timer is related to at least one of a state of the first timer or a value of the first timer. The present disclosure prevents misunderstanding of the first time-frequency resource pool, thus reducing power consumption and radio interference.

8 Claims, 5 Drawing Sheets

(51) Int. Cl.
  *H04W 72/0446* (2023.01)
  *H04W 72/0453* (2023.01)
  *H04W 76/28* (2018.01)
  *H04W 80/02* (2009.01)

(52) U.S. Cl.
  CPC ....... *H04W 72/0453* (2013.01); *H04W 76/28* (2018.02); *H04W 80/02* (2013.01)

(56) References Cited

U.S. PATENT DOCUMENTS

| | | | | |
|---|---|---|---|---|
| 2016/0088671 A1* | 3/2016 | Bergström | ............ | H04W 76/25 |
| | | | | 370/338 |
| 2016/0338141 A1* | 11/2016 | Tawashi | ................ | H04W 76/28 |
| 2019/0387572 A1* | 12/2019 | Nam | ........................ | H04W 8/24 |
| 2020/0221306 A1* | 7/2020 | Chen | .................... | H04W 16/14 |
| 2020/0367167 A1* | 11/2020 | Nam | .................... | H04W 24/08 |
| 2021/0014791 A1* | 1/2021 | Freda | ................ | H04W 52/0216 |
| 2021/0258865 A1* | 8/2021 | Park | .................... | H04W 16/02 |
| 2021/0259044 A1* | 8/2021 | Islam | ................ | H04W 52/0229 |
| 2021/0329611 A1* | 10/2021 | Karjalainen | .......... | H04W 48/12 |
| 2021/0337527 A1* | 10/2021 | Hui | ........................ | H04L 1/1861 |
| 2021/0368445 A1* | 11/2021 | Xu | .................... | H04W 52/0245 |
| 2021/0392582 A1* | 12/2021 | Chen | ........................ | H04W 52/0219 |
| 2022/0039009 A1* | 2/2022 | Iyer | ........................ | H04L 5/0098 |
| 2022/0046722 A1* | 2/2022 | Kim | .................... | H04L 5/0048 |
| 2022/0104238 A1* | 3/2022 | Aiba | ........................ | H04L 5/0053 |
| 2022/0248376 A1* | 8/2022 | Hui | .................... | H04W 72/044 |
| 2022/0264680 A1* | 8/2022 | Kim | .................... | H04W 76/15 |
| 2022/0295590 A1* | 9/2022 | Yang | .................... | H04W 76/30 |
| 2023/0042702 A1* | 2/2023 | Kim | ........................ | H04W 8/24 |
| 2023/0063472 A1* | 3/2023 | Freda | .................... | H04W 76/28 |
| 2023/0066448 A1* | 3/2023 | Tseng | .................... | H04W 76/28 |
| 2023/0107246 A1* | 4/2023 | Kang | .................... | H04W 52/02 |
| | | | | 370/329 |
| 2023/0319895 A1* | 10/2023 | Park | ...................... | H04W 72/23 |
| | | | | 370/329 |
| 2023/0363048 A1* | 11/2023 | Park | ........................ | H04W 4/40 |

FOREIGN PATENT DOCUMENTS

| | | |
|---|---|---|
| CN | 110120830 A | 8/2019 |
| CN | 110622616 A | 12/2019 |
| EP | 3500028 A1 | 6/2019 |

OTHER PUBLICATIONS

CN202010083059.7 Supplemental Search Report dated Jun. 30, 2022.
CN202010083059.7 First Office Action dated Feb. 10, 2022.
CN202010083059.7 First Search Report dated Feb. 5, 2022.
ISR in application PCT/CN2021/075059 dated Apr. 28, 2021.
Intel Corporation et al:"Discontinuous reception over SL",3GPPDraft;R2-1703502,3rd Generation Partnership Project(3GPP),Mobile Competence Centre ; 650, Route Des Lucioles ;F-06921 Sophia-Antipolis Cedex; Francevol.RAN WG2,No. Spokane,USA; Apr. 3, 2017-Apr. 7, 2017 Apr. 3, 2017 (Apr. 3, 2017).

* cited by examiner

METHOD AND DEVICE USED FOR DISCONTINUOUS RECEPTION

CROSS REFERENCE TO RELATED APPLICATIONS

This application is a continuation of International Application No. PCT/CN2021/075059, filed Feb. 3, 2021, claims the priority benefit of Chinese Patent Application No. 202010083059.7, filed on Feb. 7, 2020, the full disclosure of which is incorporated herein by reference.

BACKGROUND

Technical Field

The present disclosure relates to methods and devices in wireless communication systems, and in particular to a scheme and a device in a wireless communication system that support Discontinuous Reception.

Related Art

Discontinuous Reception (DRX) is a method commonly used in cellular communications to reduce power consumption of communication terminals and lengthen standby time. A base station manages a DRX-related timer through Downlink Control Information (DCI) or Medium Access Control (MAC) Control Elements (CEs), and then, controls whether a terminal performs wireless reception in a given subframe.

As a significant application scenario of cellular communications, Vehicle to everything (V2X) helps realize direct communications between two communication terminals.

At the 3rd Generation Partner Project (3GPP) Radio Access Network (RAN) #86 Plenary, a research project of V2X DRX was officially approved.

SUMMARY

In conventional DRX, a base station and a User Equipment (UE) can readily reach a common understanding of whether the UE monitors a Physical Downlink Control CHannel (PDCCH) in a slot. Such feature, as inventors find through researches, is being challenged in V2X: a receiving UE is probably monitoring useful signals transmitted by multiple transmitting UEs, so any useful signal transmitted by any one of the multiple transmitting UEs may have some impact on a DRX timer of the receiving UE and worse still, the lack of coordination between these transmitting UEs makes it easier to cause disagreement between the transmitting UEs and the receiving UE over the understanding of DRX state.

To address the above problem, the present disclosure provides a solution. It should be noted that though the present disclosure only took the V2X scenario for example or as a typical scenario in the statement above, it is also applicable to other scenarios confronting the same difficulty, including Downlink transmissions, where similar technical effects can be achieved. Additionally, the adoption of a unified solution for various scenarios, including but not limited to NR V2X and Downlink communications, contributes to the reduction of hardware complexity and costs. If no conflict is incurred, embodiments in any node in the present disclosure and the characteristics of the embodiments are also applicable to any other node, and vice versa. And the embodiments in the present disclosure and the characteristics in the embodiments can be arbitrarily combined if there is no conflict.

The present disclosure provides a method in a first node for wireless communications, comprising:

transmitting a first signaling, the first signaling indicating a current parameter of a first timer; and monitoring a target signal in a first time-resource set; when the target signal is detected in the first time-resource set and the first timer is in a stopped state, starting the first timer; when the first timer is in a running state, updating the first timer in each candidate slot;

herein, the current parameter of the first timer is related to at least one of a state of the first timer or a value of the first timer.

In conventional DRX, the base station controls configuration parameters of a timer such as an expiration value, the base station and the UE reach a common understanding of the state of the first timer and the value of the first timer, thus there is no need to explicitly configure the current parameter of the first timer. Therefore, the above method possesses creativity compared with the prior art.

In one embodiment, when a correspondent node is uncapable of maintaining a same count value and a same state of a timer as the first node, the above method enables that the correspondent node still can determine an active time of the first node, so as to select an appropriate time for transmission, thus ensuring communication reliability when reducing complexity.

In one embodiment, the first node is a UE.

In one embodiment, the first node is a relay node.

In one embodiment, the first node maintains a first identity (ID) list, when the first node receives any destination ID in the first ID list in the first time-resource set, the target signal is detected in the first time-resource set; and the first ID list comprises at least one destination ID.

In one embodiment, the first signaling is broadcast.

In one embodiment, the first signaling is a physical-layer signaling.

In one embodiment, the first signaling is a higher-layer signaling.

Specifically, according to one aspect of the present disclosure, the above method is characterized in comprising:

receiving a second signaling, the second signaling indicating an expiration value of the first timer;

herein, when the value of the first timer is equal to the expiration value of the first timer, the first timer is stopped.

Specifically, according to one aspect of the present disclosure, the above method is characterized in comprising:

when the target signal is detected in a candidate slot, restarting the first timer, and when the target signal is not detected in a candidate slot, updating the first timer with 1;

herein, the first timer is in a running state.

Specifically, according to one aspect of the present disclosure, wherein the phrase of monitoring a target signal in a first time-resource set includes: monitoring the target signal respectively on Downlink and Sidelink; when the target signal is detected on either the Downlink or the Sidelink, the target signal is deemed as being detected in the first time-resource set.

In one embodiment, the above method enables that a Uu interface and a PC5 interface share a same timer, which reduces complexity and saves power consumption.

Specifically, according to one aspect of the present disclosure, wherein the second signaling indicates the first time-resource set.

Specifically, according to one aspect of the present disclosure, the above method is characterized in comprising:

receiving a third signaling; and stopping the first timer;

herein, the third signaling is a MAC CE used for DRX.

Specifically, according to one aspect of the present disclosure, wherein the current parameter of the first timer comprises a difference between the value of the first timer and an expiration value of the first timer.

In one embodiment, a receiver of the first signaling is capable of determining an expiration time of the first timer according to the current parameter of the first timer; compared with directly configuring a current value of the first timer and an expiration value of the first timer, the above aspect can save signaling overhead and improve transmission efficiency.

The present disclosure provides a method in a second node for wireless communications, comprising:

receiving a first signaling, the first signaling indicating a current parameter of a first timer; and transmitting a radio signal in a first slot;

herein, the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot.

Specifically, according to one aspect of the present disclosure, wherein the current parameter of the first timer comprises an expiration value of the first timer.

Specifically, according to one aspect of the present disclosure, wherein the target signal is detected on either the Downlink or the Sidelink, the target signal is deemed as being detected in the first time-resource set.

Specifically, according to one aspect of the present disclosure, wherein the current parameter of the first timer comprises a difference between the value of the first timer and an expiration value of the first timer.

The present disclosure provides a first node for wireless communications, comprising:

a first transmitter, transmitting a first signaling, the first signaling indicating a current parameter of a first timer; and a first receiver, monitoring a target signal in a first time-resource set; when the target signal is detected in the first time-resource set and the first timer is in a stopped state, starting the first timer; when the first timer is in a running state, updating the first timer in each candidate slot;

herein, the current parameter of the first timer is related to at least one of a state of the first timer or a value of the first timer.

The present disclosure provides a second node for wireless communications, comprising:

a second receiver, receiving a first signaling, the first signaling indicating a current parameter of a first timer; and a second transmitter, transmitting a radio signal in a first slot;

herein, the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
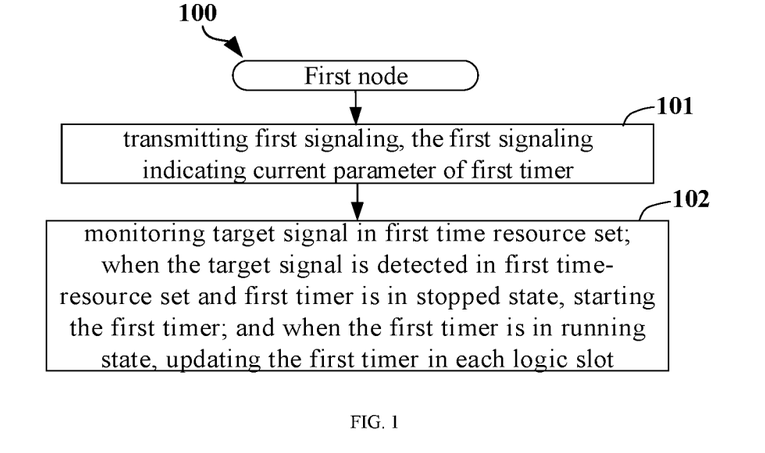
FIG. 1 illustrates a flowchart of transmitting a first signaling according to one embodiment of the present disclosure.

Embodiment 1 illustrates a flowchart of transmitting a first signaling, as shown in FIG. 1.

In Embodiment 1, a first node 100 transmits a first signaling in step S101, the first signaling indicating a current parameter of a first timer; monitors a target signal in a first time-resource set in step S102; when the target signal is detected in the first time-resource set and the first timer is in a stopped state, starts the first timer; and when the first timer is in a running state, updates the first timer in each candidate slot;

in Embodiment 1, the current parameter of the first timer is related to at least one of a state of the first timer or a value of the first timer.

In one embodiment, the first time-resource set is an active time of the first node.

In one embodiment, when the current parameter of the first timer comprises a difference between the value of the first timer and an expiration value of the first timer.

In one embodiment, the value of the first timer is a value of the first timer when the first signaling is transmitted.

In one embodiment, the value of the first timer is a value of the first timer in a L1-th slot after a slot in which the first signaling is transmitted, L1 being a positive integer.

In one embodiment, L1 is configurable.

In one embodiment, L1 is fixed.

In one embodiment, the first timer is a drx-Inactivity-Timer.

In one embodiment, a duration of the candidate slot is fixed to be 1 ms.

In one embodiment, the candidate slot is a subframe.

In one subembodiment of the above embodiment, a number of slot(s) comprised in the candidate slot is related to a subcarrier spacing (SCS).

In one embodiment, the candidate slot is a slot.

In one embodiment, the slot comprises 14 multicarrier symbols.

In one embodiment, the slot comprises 12 multicarrier symbols.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multi-carrier symbol is a Filter Bank Multicarrier (FBMC) symbol.

In one embodiment, the updating the first timer is to increase the value of the first timer by 1, or to reset the value of the first timer as 0.

In one embodiment, when the first timer is in a stopped state, the current parameter of the first timer is an expiration value of the first timer.

In one embodiment, when the first timer is in a running state, the current parameter of the first timer is less than an expiration value of the first timer.

In one embodiment, the updating the first timer is to decrease the value of the first timer by 1, or to reset the value of the first timer as an expiration value.

In one embodiment, when the first timer is in a stopped state, the current parameter of the first timer is 0.

In one embodiment, when the first timer is in a running state, the current parameter of the first timer is greater than 0.

In one embodiment, an active time of the first node comprises a time when the first timer is running.

In one embodiment, an active time of the first node comprises a time when a second timer is running, and the time when the second timer is running is configured by a base station.

In one embodiment, an active time of the first node comprises a time when a Scheduling Request (SR) transmitted by the first node is pending.

In one embodiment, an active time of the first node comprises a time when data is pending for retransmission.

In one embodiment, an active time of the first node comprises a time pending for a base station transmitting a Downlink signaling after a Random Access Response (RAR) is successfully received.

In one embodiment, if a physical-layer signaling schedules a new transmission, and the new transmission comprises any one of Downlink, Uplink or Sidelink, a target receiver of the physical-layer signaling comprises the first node.

In one embodiment, the physical-layer signaling is any one of DCI or Sidelink Control Information (SCI).

In one embodiment, the physical-layer signaling comprises an ID of the first node.

In one embodiment, the physical-layer signaling comprises a first link-layer ID, and the first link-layer ID is maintained by the first node.

In one embodiment, the new transmission refers to: the comprised Transport Block(TB) is transmitted for the first time.

In one embodiment, the new transmission refers to: the comprised Codebook Block Group (CBG) is transmitted for the first time.

In one embodiment, the physical-layer signaling is transmitted on a PDCCH.

In one embodiment, the physical-layer signaling is transmitted on a PDCCH or a Physical Sidelink Control CHannel (PSCCH).

In one embodiment, an ID of the first node is used for generating the target signal.

In one embodiment, an ID of the first node is used for generating a DeModulation Reference Signal (DMRS) of the target signal.

In one embodiment, an ID of the first node is used for scrambling Cyclic Redundancy Check (CRC) of the target signaling.

In one embodiment, the phrase of updating the first timer is to increase the value of the first timer by 1.

In one embodiment, the phrase of updating the first timer is to increase the value of the first timer by 1, or restart the first timer.

In one embodiment, an initial value of the first timer is 0.

In one embodiment, the phrase of updating the first timer is to increase the value of the first timer by 1, or to set the first timer as 0.

In one embodiment, the phrase of updating the first timer is to decrease the value of the first timer by 1, or to set the first timer as an expiration value of the first timer.

In one embodiment, an initial value of the first timer is the expiration value of the first timer.

In one embodiment, the target signaling carries a destination ID of the first node.

In one embodiment, the target signal comprises a MAC Protocol Data Unit (PDU) transmitted on a Sidelink Shared CHannel (SL-SCH).

In one embodiment, if the first node can perform monitoring in a slot, the slot belongs to a candidate slot.

In one embodiment, any two adjacent the candidate slots are consecutive in time.

In one embodiment, the operation of updating the first timer in each candidate slot is performed until the first timer expires.

In one embodiment, the operation of updating the first timer in each candidate slot is performed until a MAC CE used for DRX is received.

In one embodiment, if a slot is reserved for the target signal, the slot belongs to a candidate slot.

In one embodiment, if a slot is reserved for the target signal, and the first node does not perform wireless transmission in the slot, the slot belongs to a candidate slot.

In one embodiment, when a subcarrier bandwidth is equal to 15 kHz, a candidate slot only comprises a slot.

In one embodiment, when a subcarrier bandwidth is equal to 15 kHz multiplied by L2, a candidate slot comprises L2 slots, L2 being a positive integer greater than 1.

In one embodiment, the candidate slot is configured by a base station.

In one embodiment, there at least exist two adjacent the candidate slots that are inconsecutive in time.

In one embodiment, a slot satisfying any of the following conditions belongs to a candidate slot:
  being configured to search space of the first node;
  being configured to Sidelink transmission.

In one embodiment, the Sidelink transmission comprises a PSCCH.

In one embodiment, the Sidelink transmission comprises a Physical Sidelink Shared Channel (PSSCH).

In one embodiment, the candidate slot is configured by a base station.

In one embodiment, the candidate slot is any slot other than that the first node transmits an Uplink signal or a Sidelink signal.

In one embodiment, an initial value of the first timer is 0, and the phrase of updating the first timer is that the value of the first timer is increased by 1; when the value of the first timer is an expiration value of the first timer, the first timer is stopped.

In one embodiment, an initial value of the first timer is an expiration value of the first timer, and the phrase of updating the first timer is that the value of the first timer is decreased by 1; when the value of the first timer is 0, the first timer is stopped.

In one embodiment, the first signaling is transmitted on an Uplink.

In one embodiment, the first signaling is transmitted on a Physical Uplink Control CHannel (PUCCH).

In one embodiment, the first signaling is transmitted on Physical Uplink Shared CHannel (PUSCH).

In one embodiment, the first signaling comprises an RRC-layer information unit.

In one embodiment, the first signaling is transmitted on a Sidelink.

In one subembodiment of the above embodiment, the first signaling indicates the expiration value of the first timer.

In one embodiment, the first signaling is transmitted on a PSCCH.

In one embodiment, the first signaling is transmitted on a PSSCH.

In one embodiment, the current parameter of the first timer comprises the value of the first timer.

In one embodiment, the current parameter of the first timer comprises a difference between the value of the first timer and an expiration value of the first timer.

In one embodiment, the current parameter of the first timer comprises whether the first timer is in a running state or in a stopped state.

In one embodiment, when the first timer is in a running state, the current parameter of the first timer comprises the value of the first timer; and when the first timer is in a stopped state, the current parameter of the first timer comprises the state of the first timer.

In one embodiment, the phrase of monitoring a target signal includes judging whether the target signal exists according to coherent detection of a feature sequence.

In one embodiment, the phrase of monitoring a target signal includes judging whether the target signal exists according to received energy.

In one embodiment, the phrase of monitoring a target signal includes judging whether the target signal is received according to CRC.

In one embodiment, the destination ID of the first node comprises Y1 bits, Y1 being a positive integral multiple of 8.

In one embodiment, the ID of the first node comprises Y2 bits, Y2 being a positive integral multiple of 8.

In one embodiment, the ID of the first node is a Radio Network Temporary Identifier (RNTI).

In one embodiment, Y1 is 8.

In one embodiment, Y1 is 16.

In one embodiment, Y1 is 24.

In one embodiment, Y2 is 16.

In one embodiment, the phrase of monitoring a target signal includes: performing channel decoding in scheduled time-frequency resources, and judging whether the channel decoding is correct according to CRC.

In one embodiment, the phrase of monitoring a target signal includes: performing blind decoding, and judging whether SCI is monitored according to CRC.

In one embodiment, the phrase of monitoring a target signal includes: if CRC is not passed, judging that the target signal is not received.

In one embodiment, the phrase of monitoring a target signal includes: if CRC is passed; when a decoded information bit comprises a destination ID of the first node, judging that the target signal is received; when a destination ID in a decoded information bit does not comprise a destination ID of the first node, judging that the target signal is not received.

In one embodiment, if CRC is not passed, a target signal is not successfully received in the monitoring; and if CRC is passed, an information bit that has been through channel decoding is conveyed to a higher layer, and the higher layer judges whether the target signal is successfully received.

Embodiment 2

Figure 2:
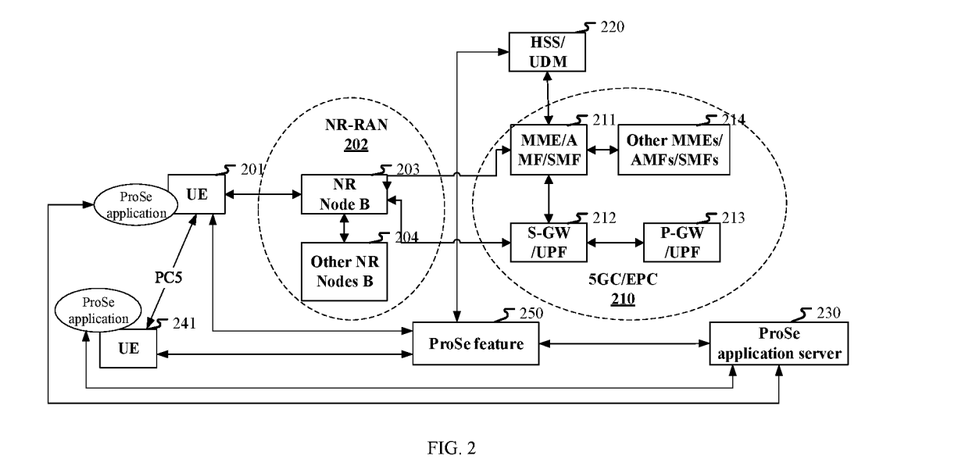
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2. FIG. 2 is a diagram illustrating a V2X communication architecture of 5G NR, Long-Term Evolution (LTE), and Long-Term Evolution Advanced (LTE-A) systems. The 5G NR or LTE network architecture may be called a 5G System/Evolved Packet System (5GS/EPS) 200 or other appropriate terms.

The V2X communication architecture in Embodiment 2 may comprise a UE 201, a UE 241 in communication with UE 201, an NG-RAN 202, a 5G Core Network/Evolved Packet Core (5GC/EPC) 210, a Home Subscriber Server (HSS)/Unified Data Management (UDM) 220, a ProSe feature 250 and a ProSe application server 230. The V2X communication architecture may be interconnected with other access networks. For simple description, the entities/interfaces are not shown. As shown in FIG. 2, the V2X communication architecture provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function(UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). The ProSe feature 250 refers to logical functions of network-related actions needed for Proximity-based Service (ProSe), including Direct Provisioning Function (DPF), Direct Discovery Name Management Function and EPC-level Discovery ProSe Function. The ProSe application server 230 is featured with functions like storing EPC ProSe user ID, and mapping between an application-layer user ID and an EPC ProSe user ID as well as allocating ProSe-restricted code-suffix pool.

In one embodiment, the UE 201 and the gNB 203 are connected via a Uu interface.

In one embodiment, the UE 201 and the UE 241 are connected via a PC5 Reference Point.

In one embodiment, the ProSe feature 250 is connected with the UE 201 and the UE 241 respectively via a PC3 Reference Point.

In one embodiment, the ProSe feature 250 is connected with the ProSe application server 230 via a PC2 Reference Point.

In one embodiment, the ProSe application server 230 is connected with the ProSe application of the UE 201 and the ProSe application of the UE 241 respectively via a PC1 Reference Point.

In one embodiment, the first node in the present disclosure is the UE 201.

In one embodiment, the second node in the present disclosure is the UE 201.

In one embodiment, the second node in the present disclosure is the gNB 203.

In one embodiment, the first node in the present disclosure is the UE 241.

In one embodiment, the second node in the present disclosure is the UE 241.

In one embodiment, the first node and the second node in the present disclosure are respectively the UE 201 and the UE 241.

In one embodiment, a wireless link between the UE 201 and the UE 241 corresponds to a Sidelink in the present disclosure.

In one embodiment, a wireless link from the UE 201 to the NR Node B is an Uplink.

In one embodiment, a wireless link from the NR Node B to the UE 201 is a Downlink.

In one embodiment, the UE 201 supports DRX transmission.

In one embodiment, the UE 241 supports DRX transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station that supports large delay difference.

In one embodiment, the gNB 203 is a flight platform.

In one embodiment, the gNB 203 is satellite equipment.

Embodiment 3

Figure 3:
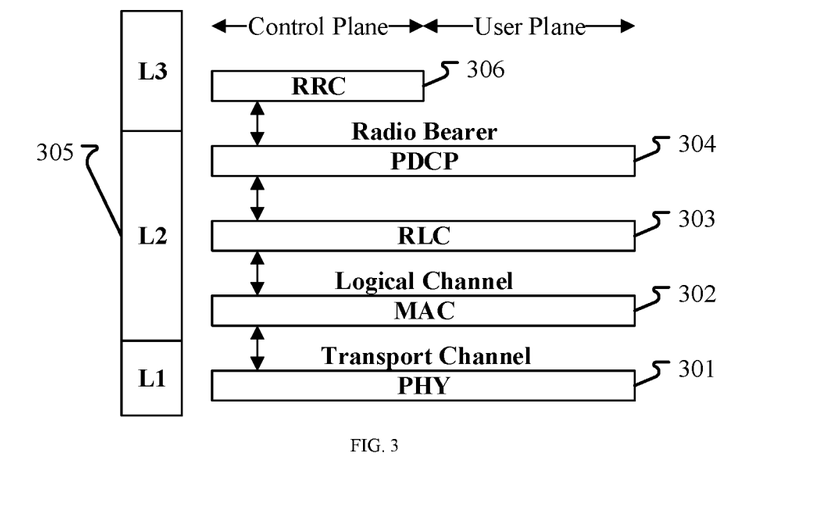
FIG. 3 illustrates a schematic diagram of a radio protocol architecture of a user plane and a control plane according to one embodiment of the present disclosure.

FIG. 3 is a schematic diagram illustrating a radio protocol architecture of a user plane and a control plane. In FIG. 3, the radio protocol architecture for a UE and a gNB is represented by three layers, which are a layer 1, a layer 2 and a layer 3, respectively. The layer 1 (L1) is the lowest layer and performs signal processing functions of various PHY layers. The L1 is called PHY 301 or physical layer in the present disclosure. The layer 2 (L2) 305 is above the PHY 301, and is in charge of the link between the UE and the gNB via the PHY 301. In the user plane, L2 305 comprises a MAC sublayer 302, a Radio Link Control (RLC) sublayer 303 and a Packet Data Convergence Protocol (PDCP)

sublayer 304. All the three sublayers terminate at the gNBs of the network side. Although not described in FIG. 3, the UE may comprise several protocol layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resources block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the L2 layer 305 belongs to a higher layer.

In one embodiment, the L3 layer RRC sublayer 306 belongs to a higher layer.

Embodiment 4

Figure 4:
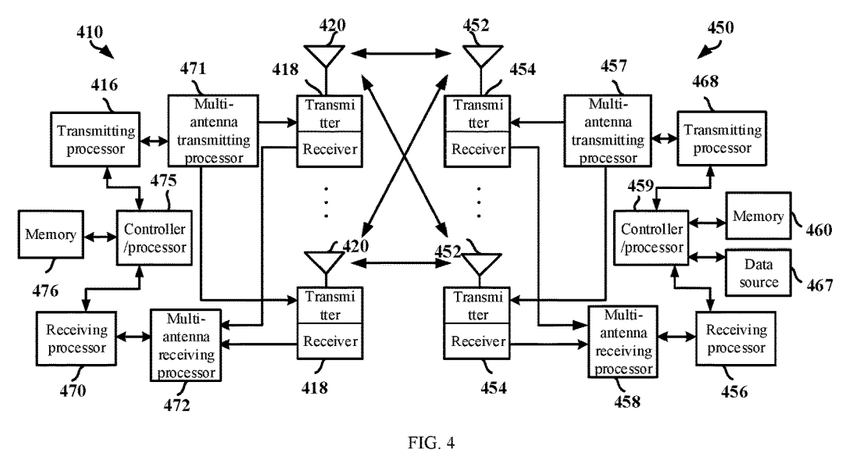
FIG. 4 illustrates a schematic diagram of hardware modules of a communication node according to one embodiment of the present disclosure.

Embodiment 4 illustrates a schematic diagram of hardware modules of a communication node according to one embodiment of the present disclosure, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication device 410 to the first communication device 450, at the second communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multi-carrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second node 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises at least one processor and at least one memory. The at least one memory comprises computer program codes; the at least one memory and the computer program codes are configured to be used in collaboration with the at least one processor, the first communication device 450 at least transmits a first signaling, the first signaling indicates a current parameter of a first timer; and monitors a target signal in a first time-resource set; when the target signal is detected in the first time-resource set and the first timer is in a stopped state, starts the first timer; when the first timer is in a running state, updates the first timer in each candidate slot; herein, the current parameter of the first timer is related to at least one of a state of the first timer or a value of the first timer.

In one embodiment, the first communication device 450 comprises a memory that stores a computer readable instruction program. The computer readable instruction program generates an action when executed by at least one processor. The action includes: transmitting a first signaling, the first signaling indicating a current parameter of a first timer; and monitoring a target signal in a first time-resource set; when the target signal is detected in the first time-resource set and the first timer is in a stopped state, starting the first timer; when the first timer is in a running state, updating the first timer in each candidate slot; herein, the current parameter of the first timer is related to at least one of a state of the first timer or a value of the first timer.

In one embodiment, the second communication device 410 comprises at least one processor and at least one memory. The at least one memory comprises computer program codes; the at least one memory and the computer program codes are configured to be used in collaboration with the at least one processor. The second communication device 410 at least receives a first signaling, the first signaling indicates a current parameter of a first timer; and transmits a radio signal in a first slot; herein, the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot.

In one embodiment, the second communication device 410 comprises a memory that stores a computer readable instruction program. The computer readable instruction program generates an action when executed by at least one processor. The action includes: receiving a first signaling, the first signaling indicating a current parameter of a first timer; and transmitting a radio signal in a first slot; herein, the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot.

In one embodiment, the first communication device 450 corresponds to a first node in the present disclosure.

In one embodiment, the second communication device 410 corresponds to a second node in the present disclosure.

In one embodiment, the first communication device 450 is a UE.

In one embodiment, the second communication device 410 is a UE.

In one embodiment, the second communication device 410 is a base station.

In one embodiment, the antenna 452, the receiver 454, the multi-antenna receiving processor 458, the receiving processor 456 and the controller/processor 459 are used to monitor a target signal.

In one embodiment, the antenna 420, the transmitter 418, the multi-antenna transmitting processor 471, the transmitting processor 416 and the controller/processor 475 are used to transmit a second signaling.

Embodiment 5

Figure 5:
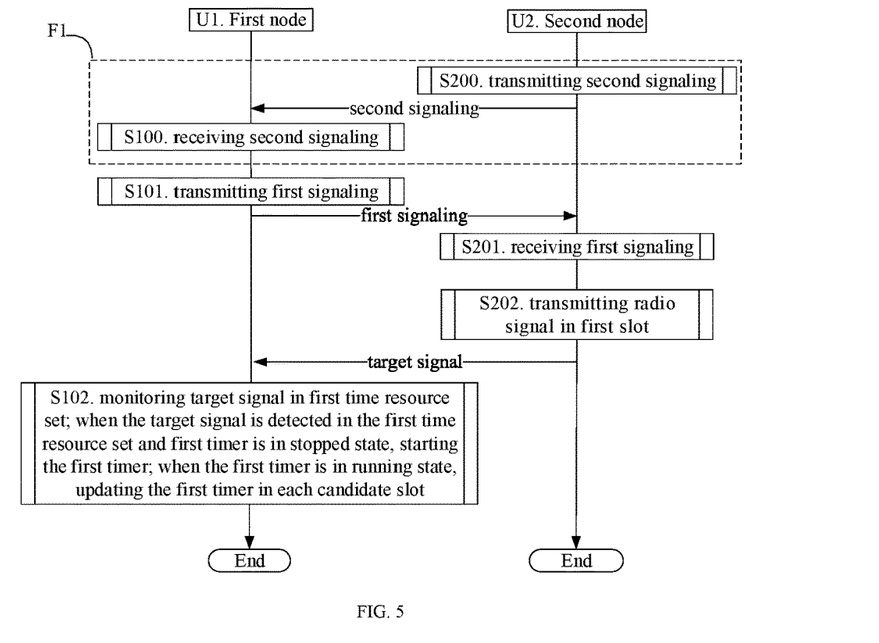
FIG. 5 illustrates a flowchart of transmission between a first node and a second node according to one embodiment of the present disclosure.

Embodiment 5 illustrates a flowchart of transmission between a first node and a second node, as shown in FIG. 5, wherein steps marked by the box F1 are optional.

The first node U1 receives a second signaling in step S100, and the second signaling indicates an expiration value of a first timer; transmits a first signaling in step S101, and the first signaling indicates a current parameter of the first timer; monitors a target signal in a first time-resource set in step S102; when the target signal is detected in the first time-resource set and the first timer is in a stopped state, starts the first timer; and when the first timer is in a running state, updates the first timer in each candidate slot.

The second node U2 transmits the second signaling in step S200; receives the first signaling in step S201; and transmits a radio signal in a first slot in step S202.

In Embodiment 5, the current parameter of the first timer is related to at least one of a state of the first timer or a value of the first timer; the current parameter of the first timer is used by the second node U2 for determining the first slot; when the target signal is detected in the first time-resource set and the first timer is in a stopped state, the first timer is started; when the first timer is in a running state, the first timer is updated in each candidate slot.

In one embodiment, steps marked by the box F1 exist, the first node U1 is a UE, and the second node U2 is a base station.

In one embodiment, the second node U2 is a base station, and the radio signal comprises an ID of the first node.

In one embodiment, the first node U1 is a UE, and the second node U2 is a UE.

In one subembodiment of the above embodiment, the second node U2 is a UE, and the radio signal comprises a destination ID of the first node U1.

In one embodiment, the radio signal is transmitted on a PSCCH, the destination ID of the first node U1 is a part of a Layer-2 destination ID maintained by the first node U1.

In one embodiment, the radio signal is transmitted on a PSSCH, and the destination ID of the first node U1 is a Layer-2 destination ID maintained by the first node U1.

In one embodiment, the second node U2 can select a first slot out of an available slot set, and the available slot set comprises multiple slots; the second node U2 determines the available slot set according to the current parameter of the first timer.

In one embodiment, the second node U2 selects an earliest slot as a first slot out of an available slot set.

In one embodiment, the second node U2 selects a slot as a first slot out of an available slot set.

In one embodiment, the second node U2 selects a slot out of an available slot set as a first slot according to a priority of the radio signal, scheduling algorithms, a current buffer idle rate and other factors.

In one embodiment, how the second node U2 determines the available slot set is implementation-related, which is related to manufacturers' scheduling algorithms.

In one embodiment, the second node U2 preferentially selects the available slot set out of an active time of the first node.

In one embodiment, the second node U2 preferentially selects the first slot out of an active time of the first node.

In one embodiment, for a given slot, the second node U2 determines whether the first node is in an active time in the given slot according to the current parameter of the first timer.

In one embodiment, the given slot does not belong to the first time-resource set.

In one embodiment, in the given slot, an ondurationtimer and a drx-RetransmissionTimer of the first node U1 are respectively stopped, there is no pending SR, and there is no DCI associated with RAR to be received.

In one embodiment, the current parameter of the first timer indicates a first time length; when a time interval between the given slot and a transmission slot of the first signaling is longer than the first time length, the second node U2 does not select the given slot as a first slot; when a time interval between the given slot and a transmission slot of the first signaling is no longer than the first time length, the given slot belongs to the available slot set.

In one embodiment, only when idle buffer of the second node U2 is less than a first threshold, the second node U2 can select an inactive time of the first node U1 to transmit the first signaling.

In one embodiment, only when a priority of the radio signal is higher than a second threshold, the second node U2 can select an inactive time of the first node U1 to transmit the first signaling.

In one embodiment, the second signaling is a higher-layer signaling.

In one embodiment, the second signaling is a Downlink signaling.

In one embodiment, the second signaling comprises all of fields in DRX-Config.

In one embodiment, the second signaling is DRX-Config.

In Embodiment 5, the second node U2 does not need to maintain a counterpart of the first timer in real time, reducing the complexity. Besides, the first node U1 can adjust the first timer more flexibly, saving power consumption.

In one embodiment, the phrase of monitoring a target signal in a first time-resource set includes: monitoring the target signal respectively on Downlink and Sidelink; when the target signal is detected on either the Downlink or the Sidelink, the target signal is deemed as being detected in the first time-resource set.

In one embodiment, when the target signal is detected on the Downlink, the target signal is DCI.

In one embodiment, when the target signal is detected on the Sidelink, the target signal comprises SCI.

In one embodiment, when the target signal is detected on the Sidelink, the target signal comprises a TB on SL-SCH.

In one embodiment, when the first timer is in a running state (i.e., being started and not expired), the first receiver monitors the target signal on at least one of Downlink or Sidelink in the slot as long as the first node does not perform wireless transmission each time passes a slot.

In one embodiment, the Downlink comprises time-frequency resources reserved for a PDCCH.

In one subembodiment of the above embodiment, the phrase of monitoring the target signal includes a Blind Decoding operation performed on DCI.

In one subembodiment of the above embodiment, the phrase of monitoring the target signal includes a Blind Decoding operation performed on SCI.

In one embodiment, the Downlink comprises time-frequency resources reserved for search space.

In one embodiment, the Downlink comprises time-frequency resources reserved for Downlink transmission.

In one embodiment, the Sidelink comprises time-frequency resources reserved for a PSCCH.

In one embodiment, the Sidelink comprises a scheduled PSSCH.

In one subembodiment of the above embodiment, the phrase of monitoring the target signal includes for decoding a PSSCH, determining whether the target signal is detected according to a link-layer ID carried by a TB on the PSSCH.

In one embodiment, the Sidelink comprises time-frequency resources reserved for V2X transmission.

In one embodiment, the Sidelink comprises time-frequency resources reserved for Device to Device (D2D) transmission.

Embodiment 6

Figure 6:
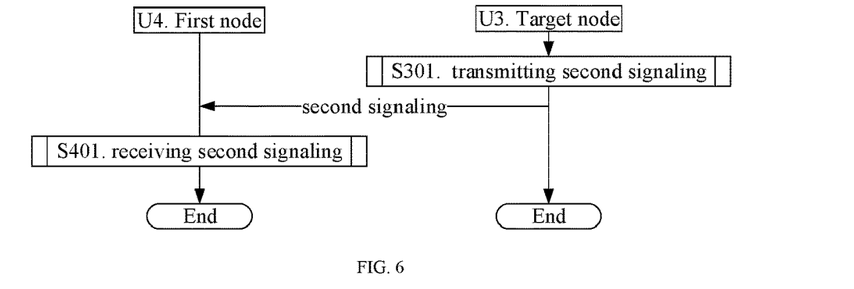
FIG. 6 illustrates a flowchart of transmission of a second signaling according to one embodiment of the present disclosure.

Embodiment 6 illustrates a flowchart of transmission of a second signaling according to one embodiment of the present disclosure, as shown in FIG. 6.

In Embodiment 6, a target node U3 transmits a second signaling in step S301; a first node U4 receives the second signaling in step S401; the target node U3 maintains a serving cell of the first node U4.

In one embodiment, steps marked by the box F1 in FIG. 5 does not exist, and the first node U1 and the second node U2 in Embodiment 5 are both UEs.

In one embodiment, the second signaling indicates the first time-resource set.

In one embodiment, the second signaling indicates a configuration parameter of a second timer, and the first time-resource set comprises a slot when the second timer is in a running state.

In one embodiment, the second timer is an onduration timer.

In one embodiment, the first time-resource set comprises multiple time intervals, and any two of the multiple time intervals are inconsecutive in time domain.

In one embodiment, any of the multiple time intervals comprises Q1 consecutive slots, Q1 being a positive integer, and the second signaling indicates the Q1.

In one embodiment, a time length between any two adjacent time intervals among the multiple time intervals is Q2 slot(s), and the second signaling indicates the Q2.

In one embodiment, durations of at least two time intervals among the multiple time intervals are different.

In one embodiment, the first time-resource set comprises a first time-resource subset and a second time-resource subset, a first receiver of the first node U4 monitors the target signal respectively on a Downlink of the first time-resource subset and a Sidelink of the second time-resource subset.

In one embodiment, the second time-resource subset and the first time-resource subset are independently configured.

In one embodiment, the second time-resource subset overlaps with the first time-resource subset in time.

In one embodiment, the first time resource subset comprises multiple first-type time intervals, and any two of the multiple first-type time intervals are inconsecutive in time domain.

In one embodiment, any of the multiple first-type time intervals comprises Q1 consecutive slots, Q1 being a positive integer, and the second signaling indicates Q1.

In one embodiment, a time length between any two adjacent first-type time intervals among the multiple first-type time intervals is Q2 slot(s), and the second signaling indicates Q2.

In one embodiment, durations of at least two first-type time intervals among the multiple first-type time intervals are different.

In one embodiment, the second time-resource subset and the first time-resource subset share partial configuration parameters.

In one embodiment, the second time-resource subset comprises K time resource subpool(s), and the second signaling respectively indicates the K time resource subpool(s) out of K time resource group(s), K being a positive integer.

In one embodiment, K is 1.

In one embodiment, K is greater than 1.

In one embodiment, the K time resource group(s) is(are) reserved for V2X.

In one embodiment, the K time resource group(s) is(are) reserved for Sidelink.

In one embodiment, the K time resource group(s) is(are) respectively K V2X resource pool(s).

In one embodiment, the second signaling indicates a configuration parameter of a third timer, and the second time-resource subset comprises a slot when the third time is in a running state.

In one embodiment, the third time is a counterpart of an onduration timer on Sidelink.

In one embodiment, the second time-resource subset comprises multiple second-type time intervals, and any two of the multiple second-type time intervals are inconsecutive in time domain.

In one embodiment, any of the multiple second-type time intervals comprises Q3 consecutive slots, Q3 being a positive integer, and the second signaling indicates Q3.

In one embodiment, Q3 and Q1 are a same value.

In one embodiment, a time length of any two adjacent second-type time intervals among the multiple second-type time intervals is Q4 slot(s), and the second signaling indicates the Q4.

In one embodiment, a time length of any two adjacent second-type time intervals among the multiple second-type time intervals is Q5 candidate slot(s), the second signaling indicates Q5, and the candidate slot is allocated to a Sidelink.

In one embodiment, durations of at least two second-type time intervals among the multiple second-type time intervals are different.

In one embodiment, the first time-resource subset partially overlaps with the second time-resource subset.

In one embodiment, the first time-resource subset is orthogonal to the second time-resource subset(i.e., there is no overlapping).

Embodiment 7

Figure 7:
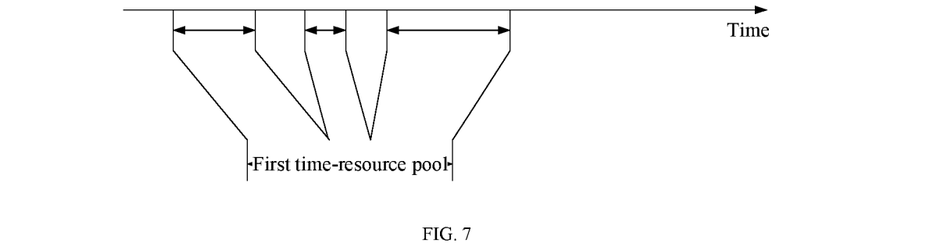
FIG. 7 illustrates a schematic diagram of a first time-resource set according to one embodiment of the present disclosure.

Embodiment 7 illustrates a schematic diagram of a first time-resource set, as shown in FIG. 7.

In Embodiment 7, the first time-resource set comprises multiple time intervals, and any two of the multiple time intervals are inconsecutive in time domain.

In one embodiment, any of the multiple time intervals comprises a positive integer number of slot(s).

In one embodiment, a slot comprises 14 multicarrier symbols.

In one embodiment, a slot comprises 12 multicarrier symbols.

In one embodiment, a slot comprises at least a search space.

Embodiment 8

Figure 8:
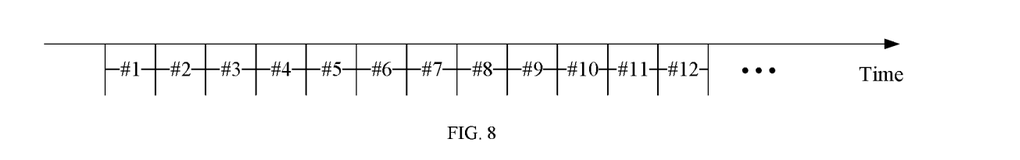
FIG. 8 illustrates a schematic diagram of a candidate slot according to one embodiment of the present disclosure.

Embodiment 8 illustrates a schematic diagram of a candidate slot, as shown in FIG. 8. In Embodiment 8, the "#number" represents a slot. In Embodiment 8, any two candidate slots do not overlap in time.

In one embodiment, any slot of #1, #2, #3, in FIG. 8 belongs to a candidate slot.

In one embodiment, a target signal is configured with a subcarrier spacing of 15 kHz, and a candidate slot only comprises one slot.

In one embodiment, a target signal is configured with a subcarrier spacing of 30 kHz, and a candidate slot comprises two slots.

In one embodiment, a candidate slot only comprises one slot. In FIG. 8, each of #1, #5, #9, #13 . . . is respectively a candidate slot; and other slots are not candidate slots.

Embodiment 9

Figure 9:
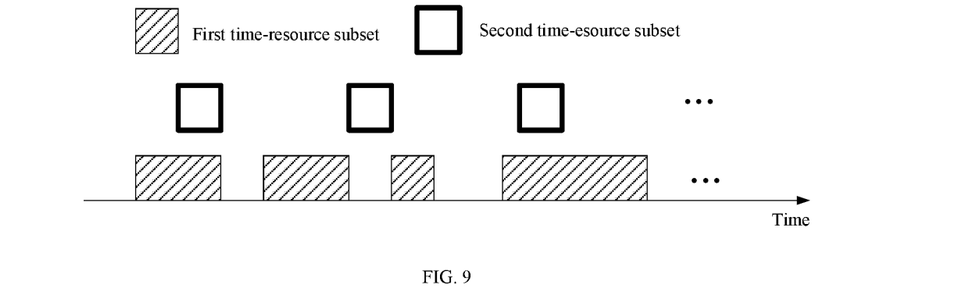
FIG. 9 illustrates a schematic diagram of a first time-resource subset and a second time-resource subset according to one embodiment of the present disclosure.

Embodiment 9 illustrates a schematic diagram of a first time-resource subset and a second time-resource subset according to one embodiment of the present disclosure, as shown in FIG. 9. In FIG. 9, a slash-filled rectangle and a blank rectangle framed with thick solid lines are respectively a first time-resource subset and a second time-resource subset.

Embodiment 10

Figure 10:
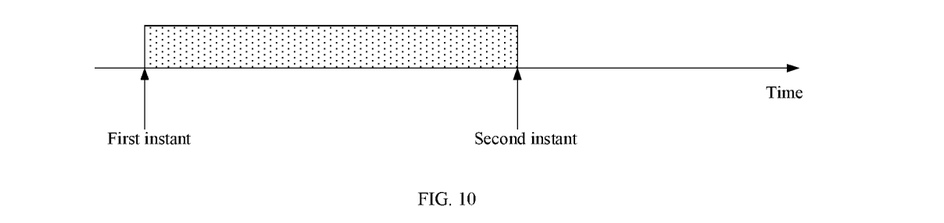
FIG. 10 illustrates a schematic diagram of a current parameter of a first timer according to one embodiment of the present disclosure.

Embodiment 10 illustrates a schematic diagram of a current parameter of a first timer according to one embodiment of the present disclosure, as shown in FIG. 10. In FIG. 10, a dot-filled rectangle represents time-domain resources indicated by a current parameter of a first timer.

In one embodiment, a first instant is an end instant of a slot occupied by a first signaling, and the current parameter of the first timer indicates a second instant.

In one embodiment, a first instant is a start instant of a slot occupied by a first signaling, and the current parameter of the first timer indicates a second instant.

In one embodiment, the current parameter of the first timer indicates a number of slot(s) between a first instant and a second instant.

In one embodiment, the current parameter of the first timer indicates a number of subframe(s) between a first instant and a second instant.

Embodiment 11

Figure 11:
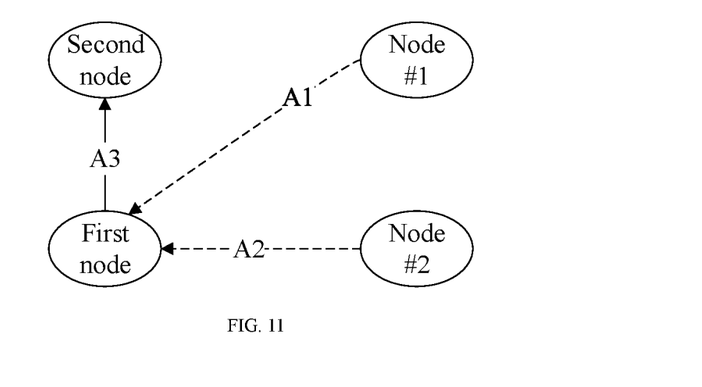
FIG. 11 illustrates a schematic diagram of utilizing a current parameter of a first timer to realize resource selection according to one embodiment of the present disclosure.

Embodiment 11 illustrates a schematic diagram of utilizing a current parameter of a first timer to realize resource selection according to one embodiment of the present disclosure, as shown in FIG. 11.

In Embodiment 11, a first node receives target signals of a second node, node #1, and node #2 simultaneously; the node #1 and the node #2 transmit target signals to the first node respectively through links A1 and A2 and affect a DRX state of the first node; the second node does not need to detect target signals transmitted by the node #1 and the node #2, and judges the DRX state of the first node according to a first signaling transmitted by the first node.

In one embodiment, the second node is a UE, the node #1 is a base station, the node #1 transmits a second signaling to the first node, and the first signaling comprises information of the second signaling.

In the above embodiment, the second node can further determine a first time-resource set according to a first signaling, and the first time-resource set and a time when a first timer is in a running state both belong to an active time of the first node.

In one embodiment, the first timer is a DRX inactivity timer.

In one embodiment, the first timer is a Sidelink DRX inactivity timer.

In one embodiment, the first timer is an onduration timer.

In one embodiment, the first timer is a Sidelink onduration timer.

Embodiment 12

Figure 12:
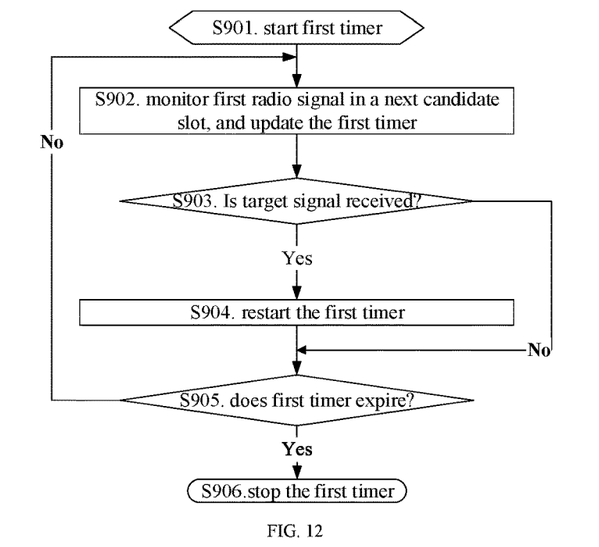
FIG. 12 illustrates a flowchart of timekeeping by utilizing a first timer according to one embodiment of the present disclosure.

Embodiment 12 illustrates a flowchart of timekeeping by utilizing a first timer according to one embodiment of the present disclosure, as shown in FIG. 12. Steps illustrated by FIG. 12 are implemented in a first node.

Start a first timer in step S901; in step S902, monitor a target signal in a next candidate slot, and update the first timer; judge whether the target signaling is received in step S903; if yes, restart a timer in step S904, and if no, judge whether the first timer expires in step S905; if yes, stop the first timer in step S906; and if no, skip to the step S902.

In one embodiment, the starting a first timer is to set the first timer as 0, and the updating the first timer is to increase a value of the first timer by 1; if the first timer is equal to a first integer, the first timer expires, otherwise the first timer does not expire.

In one embodiment, the starting a first timer is to set the first timer as a first integer, and the updating the first timer is to decrease a value of the first timer by 1; if the first timer is equal to 0, the first timer expires, otherwise the first timer does not expire.

In one embodiment, the first integer is fixed.

In one embodiment, the first integer is an expiration value of the first timer.

In one embodiment, the next candidate slot is a nearest upcoming slot.

In one embodiment, the next candidate slot is a nearest upcoming slot reserved for V2X or a PDCCH.

Embodiment 13

Figure 13:
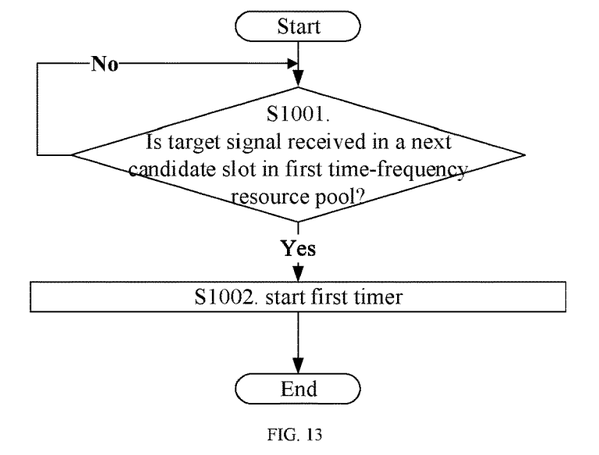
FIG. 13 illustrates a flowchart of starting a first timer according to one embodiment of the present disclosure.

Embodiment 13 illustrates a flowchart of starting a first timer according to another embodiment of the present disclosure, as shown in FIG. 13. Steps illustrated by FIG. 13 are implemented in a first node.

In step S1001, monitor a target signal in a next candidate slot in a first time-frequency resource set; if the target signal is received, start a first timer in step S1002, if not, return to step S1001.

In one embodiment, the first timer is a DRX inactivity timer.

In one embodiment, the starting a first timer is to set the first timer as 0, and the updating the first timer is to increase a value of the first timer by 1; if the first timer is equal to a second integer, the first timer expires, otherwise the first timer does not expire.

In one embodiment, the starting a first timer is to set the first timer as a first integer, and the updating the first timer is to decrease a value of the first timer by 1; if the first timer is equal to 0, the first timer expires, otherwise the first timer does not expire.

In one embodiment, the next candidate slot is a nearest upcoming slot.

In one embodiment, the next candidate slot is a nearest upcoming slot reserved for V2X and at an active time.

In one embodiment, the next candidate slot is a nearest upcoming slot reserved for a same V2X resource pool and at an active time.

In one embodiment, the first timer is maintained on the MAC layer.

In one embodiment, the first timer is maintained by a MAC entity.

In one embodiment, when the first timer is running, the first node is in a continuous reception state.

Embodiment 14

Figure 14:
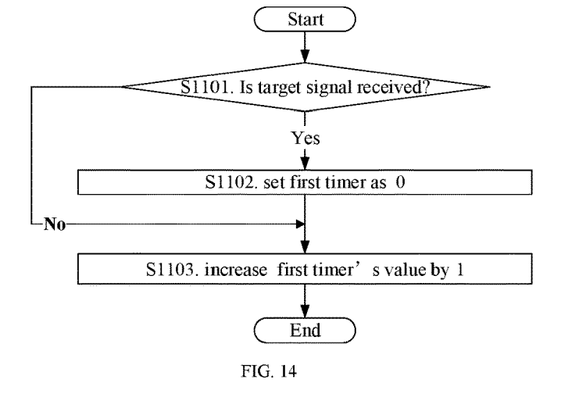
FIG. 14 illustrates a flowchart of updating a first timer according to one embodiment of the present disclosure.

Embodiment 14 illustrates a flowchart of updating a first timer according to one embodiment of the present disclosure, as shown in FIG. 14. In step S1101, judge whether a first signaling is received, if yes, set a first timer as 0 in step S1102, if no, increase a value of the first timer by 1 in step S1103.

Embodiment 15

Figure 15:
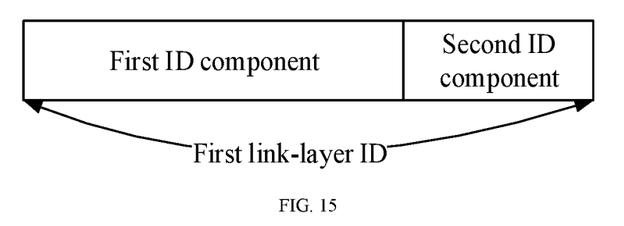
FIG. 15 illustrates a schematic diagram of a first link-layer ID according to one embodiment of the present disclosure.

Embodiment 15 illustrates a schematic diagram of a first link-layer ID according to one embodiment of the present disclosure, as shown in FIG. 15.

In Embodiment 15, the first link-layer ID consists of a first ID component and a second ID component.

In one embodiment, the first ID component and the second ID component respectively consist of 16 bits and 8 bits.

In one embodiment, the first ID component and the second ID component are respectively carried by SCI and a PSSCH.

In one embodiment, any destination ID of a first node is a first link-layer ID.

In one embodiment, any destination ID of a first node is a first ID component in a first link-layer ID.

Embodiment 16

Figure 16:
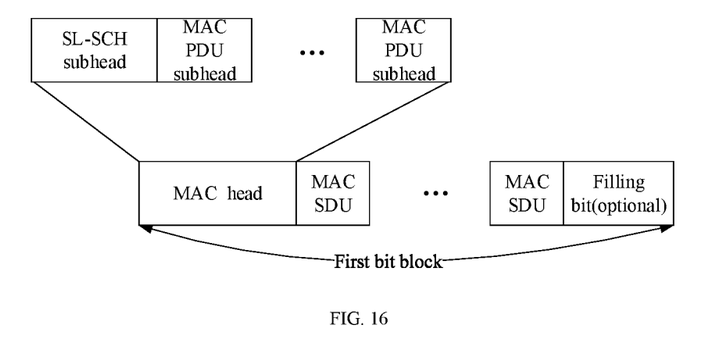
FIG. 16 illustrates a schematic diagram of a first bit block according to one embodiment of the present disclosure.

Embodiment 16 illustrates a schematic diagram of a first bit block according to one embodiment of the present disclosure, as shown in FIG. 16.

In Embodiment 16, the first bit block comprises a MAC head, and at least one MAC SDU, and also optional filling bit; the MAC head comprises a SL-SCH subhead and at least one MAC PDU subhead. The SL-SCH subhead comprises a first ID component.

In one embodiment, a target signal is obtained by a first bit block sequentially through channel coding, scrambling, modulation, layer mapping, precoding, resource mapping, generation of multicarrier symbols.

In one embodiment, a target signal is obtained by a first bit block sequentially through CRC Insertion, channel coding, scrambling, modulation, resource mapping and generation of multicarrier symbols.

In one embodiment, a target signal is obtained by a first bit block through scrambling, CRC coding, channel coding, rescrambling, modulation, resource mapping and generation of multicarrier symbols.

Embodiment 17

Figure 17:
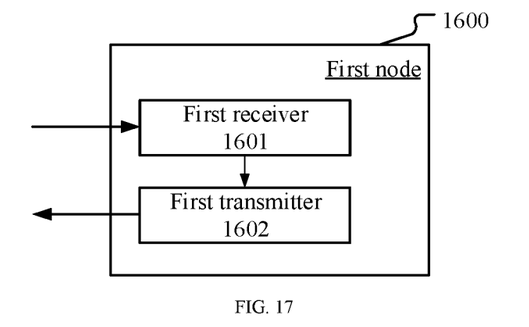
FIG. 17 illustrates a structure block diagram of a processing device in a first node according to one embodiment of the present disclosure.

Embodiment 17 illustrates a structure block diagram of a processing device in a first node according to one embodiment of the present disclosure; as shown in FIG. 17. In FIG. 17, a first node's processing device 1600 comprises a first receiver 1601 and a first transmitter 1602.

The first receiver 1601 receives a second signaling, and the second signaling indicates an expiration value of a first timer; the first transmitter 1602 transmits a first signaling, and the first signaling indicates a current parameter of the first timer; the first receiver 1601 monitors a target signal in a first time-resource set; when the target signal is detected in the first time-resource set and the first timer is in a stopped state, starts the first timer; when the first timer is in a running state, updates the first timer in each candidate slot;

In Embodiment 17, the current parameter of the first timer is related to at least one of a state of the first timer or a value of the first timer; when the value of the first timer is equal to the expiration value of the first timer, the first timer is stopped.

In one embodiment, the first receiver 1601, when the target signal is detected in a candidate slot, restarts the first timer, and when the target signal is not detected in a candidate slot, updates the first timer with 1; herein, the first timer is in a running state.

In one embodiment, the phrase of monitoring a target signal in a first time-resource set includes: monitoring the target signal respectively on Downlink and Sidelink; when the target signal is detected on either the Downlink or the Sidelink, the target signal is deemed as being detected in the first time-resource set.

In one embodiment, the second signaling indicates the first time-resource set.

In one embodiment, the first receiver 1601 receives a third signaling; stops the first timer; herein, the third signaling a MAC control unit used for DRX.

In one embodiment, the current parameter of the first timer is used for triggering the third signaling.

In one embodiment, how a second node according to the current parameter of the first timer is implementation-related, that is, it is implemented by manufacturers' scheduling algorithms.

In one embodiment, when a time length of the current parameter of the first timer is greater than a specific threshold, a second node transmits the third signaling.

In one embodiment, the specific threshold is not less than 4 ms.

In one embodiment, the first receiver stops a second timer until a next first-type time interval among the multiple first-type time intervals in the first time-resource subset.

In one embodiment, the first receiver does not stop a third timer.

In one embodiment, the third signaling is a DRX Command MAC CE.

In one embodiment, the third signaling is a Long DRX Command MAC CE.

In one embodiment, the second signaling indicates a configuration parameter of a second timer, and the first time-resource subset comprises a slot when the second timer is in a running state.

In one embodiment, the second timer is an onduration timer.

In one embodiment, the current parameter of the first timer comprises a difference between the value of the first timer and the expiration value of the first timer.

In one embodiment, the first node 1600 is a UE.

In one embodiment, the first transmitter 1602 comprises at least one of the antenna 452, the transmitter/receiver 454, the multi-antenna transmitting processor 457, the transmitting processor 468, the controller/processor 459, the memory 460 or the data source 467 in FIG. 4 of the present disclosure.

In one embodiment, the first transmitter 1602 comprises the antenna 452, the transmitter/receiver 454, the multi-antenna transmitting processor 457, the transmitting processor 468, the controller/processor 459, the memory 460 and the data source 467 in FIG. 4 of the present disclosure.

In one embodiment, the first receiver 1601 comprises at least the first five of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first four of the antenna 452, the receiver 454, the multi-antenna receiving processor 458, the receiving processor 456, the controller/processor 459, the memory 460 and the data source 467 in FIG. 4 of the present disclosure.

In one embodiment, the first receiver 1601 comprises at least the first three of the antenna 452, the receiver 454, the multi-antenna receiving processor 458, the receiving processor 456, the controller/processor 459, the memory 460 and the data source 467 in FIG. 4 of the present disclosure.

Embodiment 18

Figure 18:
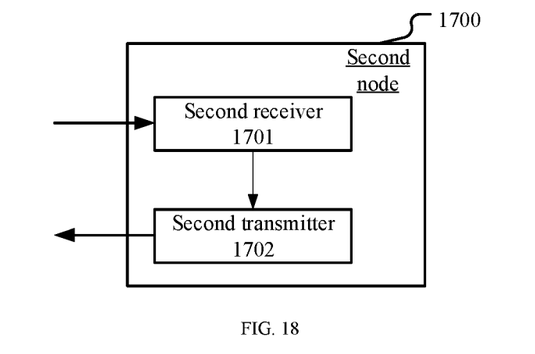
FIG. 18 illustrates a structure block diagram of a processing device in a second node according to one embodiment of the present disclosure.

Embodiment 18 illustrates a structure block diagram of a processing device in a second node according to one embodiment of the present disclosure; as shown in FIG. 18. In FIG. 18, a second node's processing device 1700 comprises a second receiver 1700 and a second transmitter 1702.

The second receiver 1701 receives a first signaling, and the first signaling indicates a current parameter of a first timer; the second transmitter 1702 transmits a radio signal in a first slot.

in Embodiment 18, the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot.

In one embodiment, the current parameter of the first timer comprises an expiration value of the first timer.

In one embodiment, the target signal is detected on either the Downlink or the Sidelink, the target signal is deemed as being detected in the first time-resource set.

In one embodiment, the current parameter of the first timer comprises a difference between the value of the first timer and an expiration value of the first timer.

In one embodiment, the second node 1700 is a UE.

In one embodiment, the second node 1700 is a base station.

In one embodiment, the second transmitter 1702 transmits a second signaling, the second signaling indicates the expiration value of the first timer, herein, when the value of the first timer is equal to the expiration value of the first timer, the first timer is stopped.

In one embodiment, the second transmitter 1702 comprises the antenna 420, the transmitter 418, the transmitting processor 416 and the controller/processor 475.

In one embodiment, the second transmitter 1702 comprises the antenna 420, the transmitter 418, the multi-antenna transmitting processor 471, the transmitting processor 416 and the controller/processor 475.

In one embodiment, the second receiver 1701 comprises the antenna 420, the receiver 418, the multi-antenna receiving processor 472, the receiving processor 470 and the controller/processor 475.

In one embodiment, the second receiver 1701 comprises the controller/processor 475.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RF ID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A node for wireless communications, comprising:
a receiver, receiving a first signaling, the first signaling indicating a current parameter of a first timer that comprises an expiration value of the first timer; and
a transmitter, transmitting a radio signal in a first slot;
wherein:
the current parameter of the first timer is used for determining the first slot;
the current parameter of the first timer is related to at least one of a state of the first timer or a value of the first timer;
when a target signal is detected in a first time-resource set and the first timer is in a stopped state, the first timer is started;
when the first timer is in a running state, the first timer is updated in each candidate slot; and
when the target signal is detected on either Downlink or Sidelink, the target signal is detected in the first time-resource set.

2. The node according to claim 1, wherein the first timer is a drx-InactivityTimer, or, the first time-resource set is an active time of the first node.

3. A node for wireless communications, comprising:
a receiver, receiving a first signaling, the first signaling indicating a current parameter of a first timer that comprises a difference between the value of the first timer and an expiration value of the first timer; and a transmitter, transmitting a radio signal in a first slot;

wherein:
- the current parameter of the first timer is used for determining the first slot;
- the current parameter of the first timer is related to at least one of a state of the first timer or a value of the first timer;
- when a target signal is detected in a first time-resource set and the first timer is in a stopped state, the first timer is started;
- when the first timer is in a running state, the first timer is updated in each candidate slot; and
- when the target signal is detected on either Downlink or Sidelink, the target signal is detected in the first time-resource set.

4. The node according to claim 3, wherein the first timer is a drx-Inactivity Timer, or, the first time-resource set is an active time of the first node.

5. A method in a node for wireless communications, comprising:

receiving a first signaling, the first signaling indicating a current parameter of a first timer that comprises an expiration value of the first timer; and transmitting a radio signal in a first slot;

wherein the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot; when the target signal is detected on either Downlink or Sidelink, the target signal is detected in the first time-resource set.

6. The method in a node for wireless communications according to claim 5, wherein the first timer is a drx-InactivityTimer, or, the first time-resource set is an active time of the first node.

7. A method in a node for wireless communications comprising:

receiving a first signaling, the first signaling indicating a current parameter of a first timer that comprises a difference between the value of the first timer and an expiration value of the first timer; and transmitting a radio signal in a first slot;

wherein the current parameter of the first timer is used for determining the first slot; the current parameter of the first timer is related to at least one of a state of the first timer or a value of the first timer; when a target signal is detected in a first time-resource set and the first timer is in a stopped state, the first timer is started; when the first timer is in a running state, the first timer is updated in each candidate slot; when the target signal is detected on either Downlink or Sidelink, the target signal is detected in the first time-resource set.

8. The method in a node for wireless communications according to claim 7, wherein the first timer is a drx-InactivityTimer, or, the first time-resource set is an active time of the first node.

* * * * *